UNITED STATES PATENT OFFICE.

ROBERT HOSKIN, OF BROOKLYN, NEW YORK.

IMPROVED COMPOSITION FOR OIL-CLOTH.

Specification forming part of Letters Patent No. 40,411, dated October 27, 1863.

*To all whom it may concern:*

Be it known that I, ROBERT HOSKIN, of Brooklyn, in the county of Kings and State of New York, have invented a new and Improved Composition for Oil-Cloth; and I do hereby declare that the following is a full, clear, and exact description of the same.

This invention relates to a new and improved composition for placing on canvas or cloth to receive the colors which are printed on the composition by means of blocks, and which fabric is commonly termed "oil-cloth," the same being used for floor-cloths, table-covers, and like purposes.

In preparing canvas or cloth to receive the colors the practice hitherto has been to first size the canvas or cloth and then cover the same with a composition of whiting and ocher mixed with linseed-oil. Several coats of this are used, each coat requiring to be dry before the succeeding one is laid on.

My invention consists in using whiting and ocher or equivalent material mixed with glue dissolved in milk. This composition is laid directly upon the canvas and forms a plaster and size combined, no previous sizing of the canvas being required. This composition dries quickly, and several coats may be applied in a comparatively short period of time. The last coat used is the same as that now employed—to wit, whiting and ocher mixed with linseed-oil. This latter coat receives the colors.

The whiting and ocher in my composition are used about in equal quantities and mixed with the glue dissolved in milk until the mass is brought to the proper degree of consistency to be laid on the canvas or cloth. This composition fills the interstices of the canvas or cloth and is pliable, so that it will not crack, and in consequence of the composition drying rapidly the goods can be finished in three or four days, whereas by the old plan from twelve to fourteen days are required. I effect also a great saving in expense in the way of material, as but one-third of the usual quantity of linseed-oil is required, and that is comparatively an expensive material, especially at present.

My composition may be applied to the canvas or cloth either warm or cold, and it may be also mixed to advantage with the ordinary linseed-oil preparation.

I would remark that whiting and ocher are the materials which will be generally used; but there are equivalent materials which will answer nearly as well. For instance, paris-white may be used instead of whiting, and Venetian red or Grafton paint may be used instead of ocher. The glue dissolved in milk, however, cannot be in any case dispensed with.

Having thus described my invention, what I claim as new, and desire to secure by Letters Patent, is—

A composition or plaster for oil-cloth, composed of whiting and ocher or equivalent or analogous substances in about equal proportions and mixed to the proper or desired consistency with glue dissolved in milk.

ROBERT HOSKIN.

Witnesses:
  M. S. PARTRIDGE,
  DANIEL ROBERTSON.